US006233655B1

(12) United States Patent
Shum et al.

(10) Patent No.: US 6,233,655 B1
(45) Date of Patent: May 15, 2001

(54) METHOD FOR QUAD-WORD STORING INTO 2-WAY INTERLEAVED L1 CACHE

(75) Inventors: Chung-Lung Kevin Shum; Wen He Li; Charles Franklin Webb, all of Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/070,146

(22) Filed: Apr. 30, 1998

(51) Int. Cl.$^7$ ........................................... G06F 12/00
(52) U.S. Cl. .................... 711/127; 711/131; 711/128; 711/157; 711/149
(58) Field of Search ........................ 711/127, 131, 711/157, 128, 149

(56) References Cited

U.S. PATENT DOCUMENTS

| 4,736,293 | * | 4/1988 | Patrick ................................. 364/200 |
| 5,333,291 | * | 7/1994 | Grunbok ............................... 395/425 |
| 5,367,653 | * | 11/1994 | Coyle et al. .......................... 395/400 |
| 5,559,986 | | 9/1996 | Aplert et al. . |
| 5,581,734 | * | 12/1996 | DiBrino et al. ...................... 395/496 |
| 5,761,714 | * | 6/1998 | Liu et al. .............................. 711/127 |
| 5,946,710 | * | 8/1999 | Bauman et al. ...................... 711/129 |
| 5,978,887 | * | 11/1999 | Yeager ................................. 711/127 |

OTHER PUBLICATIONS

"Split Cache With Variable Interleave Boundary" IBM Technical Disclosure Bulletin, vol. 22, No. 11, Apr. 1980, pp. 5183–5186.

"Quadword Cache Buffer" IBM Technical Disclosure Bulletin, vol. 24, No. 11A, Apr. 1982, pp.5398–5399.

"Fast Cache Access Based On Most Recently Used Hits" IBM Technical Disclosure Bulletin, vol. 30, No. 10, Mar. 1988, pp. 1–4.

"Improving Operational Performance of Cache Memories–By Reducing Cache Miss Penalties" IBM Technical Disclosure Bulletin, No. 296, Dec. 1988.

"High Utilization Bi–directional Storage Bus for a Vector Processor" IBM Technical Disclosure Bulletin, vol. 36, No. 10, Oct. 1993, pp. 401–402.

"Selecting the Next Line to Update the L2 from the Store Stack" IBM Technical Disclosure Bulletin, vol. 36, No. 12, Dec. 1993, pp. 189–190.

* cited by examiner

*Primary Examiner*—Do Hyun Yoo
*Assistant Examiner*—Kimberly McLean
(74) *Attorney, Agent, or Firm*—Lynn L. Augspurger

(57) ABSTRACT

A computer processor has an I-unit (instruction unit) and instruction decoder, an E-unit (execution unit), a Buffer Control Element (BCE) containing a unified two-way interleaved L1 cache and providing write control to said two-way interleaved L1 cache. The processor has Double Word wide execution dataflow. An instruction decoder receiving instruction data from a unified cache before decoding causes, for stores, I-unit logic to initiate a request ahead of execution to tell the buffer control element that stores will be made from the E-unit, and E-unit logic sends a store request to initiate a store after decoding corresponding instruction data which indicates what address in the cache the Double-Word data is to be stored to. In the process, E-unit logic calculates, from source and destination address information address ranges information in an instruction, whether a corresponding multi-Double Word store with same byte data will result from the data patterns, and, when a multi-Double Word store could result, it enables the E-unit to request the writing of an incoming Double Word on the computer's data bus for both Double Word L1 cache interleaves using the same address for both to effectively write two consecutively addressed DoubleWords for the same cycle to achieve a Quad Word store in a cycle.

3 Claims, 2 Drawing Sheets

METHOD FOR QUAD-WORD STORING INTO 2-WAY INTERLEAVED L1 CACHE

FIELD OF THE INVENTION

This invention is related to computers and computer systems and in particular to a method for selectively storing Quad Words into a two-way interleaved L1 cache with a Double Word wide execution dataflow.

BACKGROUND OF THE INVENTION

In attempting to improve performance in data transfers in complex machines which can have both Quad Word (QW) and Double Word (DW) stores, in the past the apparent solution for using a QW store to cache instead of two double word stores in order to double the data stored per cycle was to increase the data-path size within the execution unit (E-unit) and also the data-path from the E-unit to the BCE (Buffer Control Element which provides a level 1 cache). However, increasing the data-path is expensive in the use of chip area and complexity and results in a much bigger and more complex CPU. We thought it would be desirable to achieve a QW store with a single DW wide data-path and determined how this could be achieved.

SUMMARY OF THE INVENTION

The preferred embodiment permits a Quad Word (QW) store per cycle with a single Double Wide (DW) wide data-path. The implementation provided enables bandwidth improvement without accompanying costs involved in having a wider data bus. Indeed, we now believe that our solution as illustrated by our preferred embodiment could be useful in any processor design that has a small data-bus trying to execute instructions as if there is a wider data-bus, in order to provide better performance.

These and other improvements are set forth in the following detailed description. For a better understanding of the invention with advantages and features, refer to the description and to the drawings.

(Note: For convenience of illustration, FIGURES may be separated in parts and as a convention we place the top of the FIGURE as the first sheet, with subsequent sheets proceeding down and across when viewing the FIGURE, in the event that multiple sheets are used.)

DETAILED DESCRIPTION OF THE INVENTION

Before considering our preferred embodiments in detail, it may be worthwhile to note that our preferred embodiment is to be implemented in an IBM (International Business Machines Corporation) S/390 scale system, in which the processor chip has an Instruction Unit, Execution Unit, and level 1 cache L1 unified with a control element BCE (Buffer Control Element).

Figure 1:
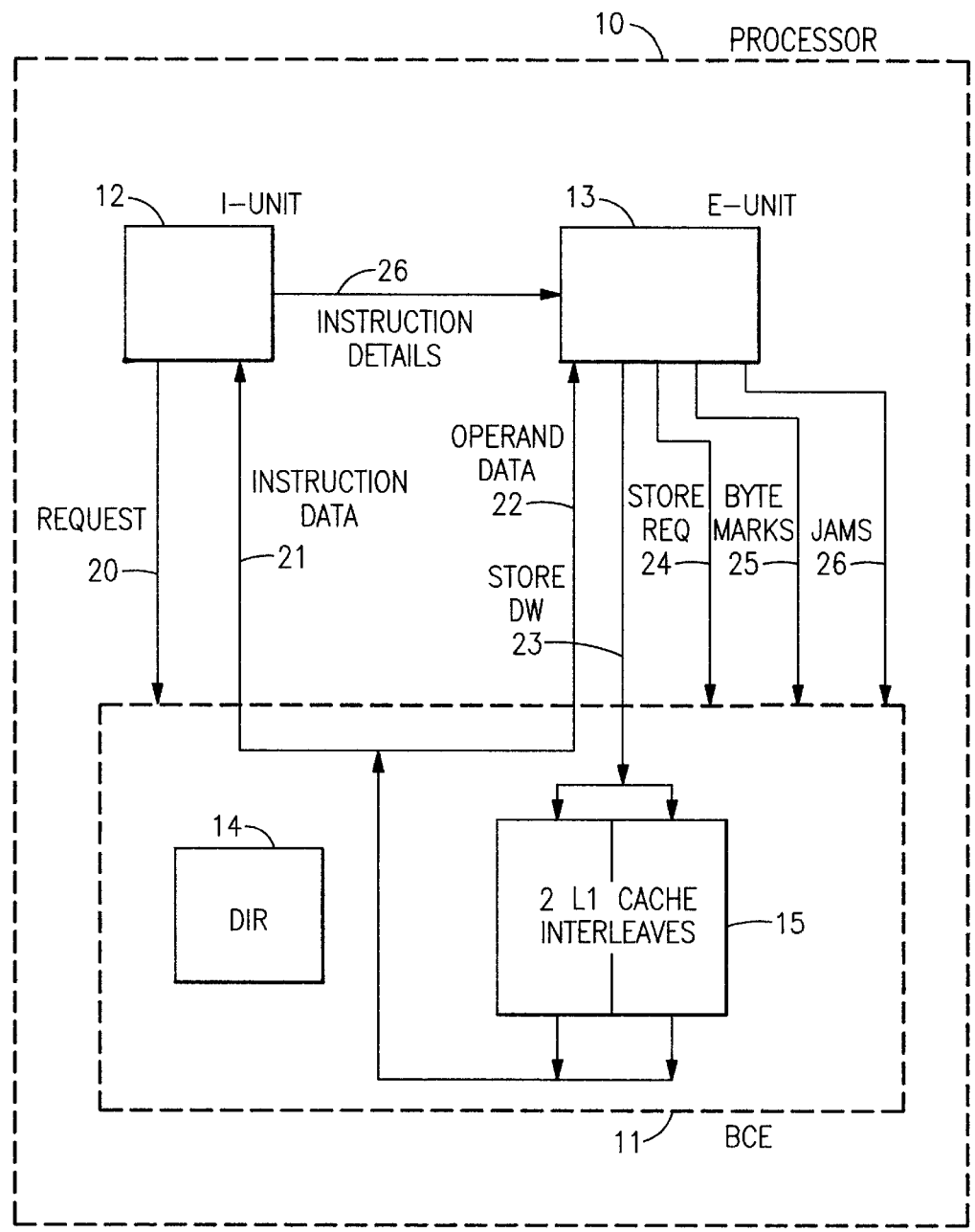
FIG. 1 illustrates the preferred embodiment of a processor which has an I-Unit, and E-unit and a L1 cache.

Turning to our invention in more detail as illustrated in FIG. 1 illustrating the preferred embodiment of the planned processor (10) which contains an I-unit (12), an E-unit (13) and a BCE (11). The BCE (11) contains the unified 256K byte store-through L1 cache (15). The cache (15) is 4-way set associative with a corresponding directory (14). The cache (15) is 2-way interleaved on a DW (doubleword) basis, allowing separate operations (reads or writes) in each interleave per cycle, as long as the 2 operations are for different values of address bit 28 (which indicates whether it is a ODD or EVEN DW within the 31 bit address space).

I-unit (12) receives the necessary instruction data (21) from the unified cache (15) before decode. After decoding an instruction that stores, the I-unit (12) will make a request (20) ahead of execution to tell the BCE (11) that stores will be made shortly by the E-unit (13). I-unit (12) will also make the fetches for any required operand data (22) needed to execute the store instruction.

When E-unit (13) is ready to execute the store instruction, it will send a QW or DW store request (24) together with the corresponding DW data (23). Each DW of store data (23) also comes with 8 byte marks (25) that say which bytes of the DW are actually going to be stored-to. If a QW store is requested, each interleave also receives a JAM byte mark (26) signal to override the 8 byte marks to all 1's, thus storing the whole DW data (23) into the cache address. The merging of old and new data is done at L1 write time. Store data (23) from the E-unit (13) is usually written into the cache (15) 1 DW at a time, i.e. it only writes to a maximum of 1 interleave per cycle. The single DW bandwidth from the E-unit is inherent in the whole planned data-path structure throughout the processor.

Analysis had shown that performance of instructions involving multi-DW stores are being limited, due to the fact that only one DW is stored to L1 per CP cycle. Cycle-per-instruction (CPI) for those instructions are thus comparably worse than for a processor with wider data-bus.

In many programs, a large portion of the multi-DW store instructions that impact performance are in fact storing the same data to each byte of the operand, and because the L1 cache is 2-way interleaved, the control interface between the E-unit and L1 cache is enhanced to selectively do a QW (quad-word) store per cycle. E-unit determines from the instruction details (26) used to enable the QW store capability.

Figure 2:
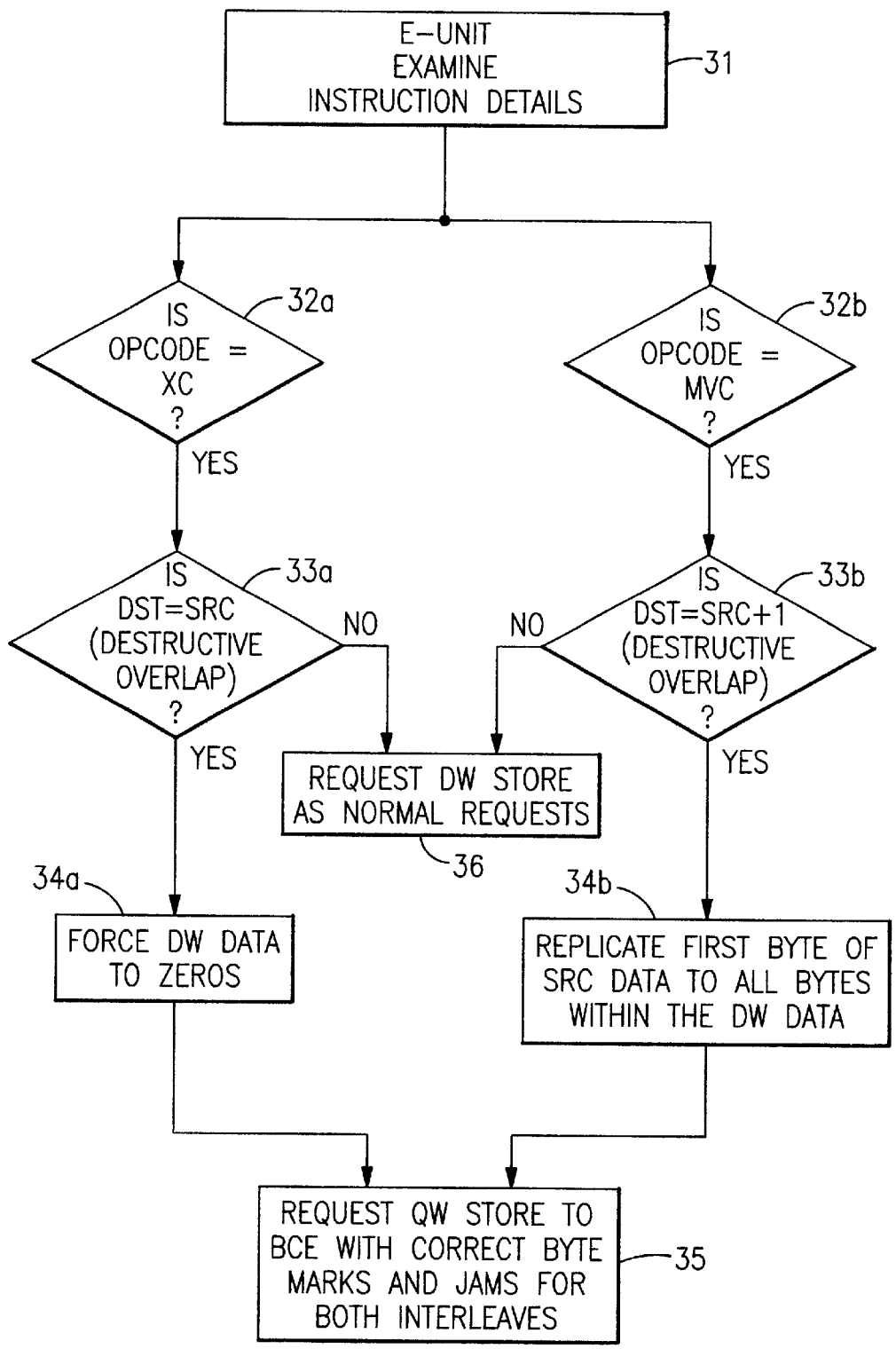
FIG. 2 shows the dataflow illustrating the steps used in the E-unit to determine when to enable the interface for Quad Word stores.

FIG. 2 illustrates the dataflow illustrating the steps used in the E-unit to determine when to enable the interface between E-unit and BCE to handle Quad Word stores per cycle. More specifically, after receiving the details of an instruction (31) to be executed from the I-unit, the execution unit will recognize instructions that could possibly result with the same data patterns, i.e. XC and MVC, in (32a) and (32b).

For those two instructions, the E-unit will then calculate from the source and destination address ranges whether the corresponding multi-DW stores will definitely result with the same data patterns, i.e.

XC (when the two operand addresses overlap exactly, i.e. destination address=source address), (33a);

MVC (with one byte destructive overlap on the two operand addresses, i.e. destination address=source address+1), (33b).

Those two instruction sequences will result in the same data for every byte in the whole store length. For XC, every byte will be zero, (34a). For MVC, every byte is the same as the first source byte, (34b).

On the other hand, if the source and destination address ranges do not fall into the desired patterns, the E-unit will by default do single DW store per cycle as it will normally does, 36.

Once the possibility of QW store is recognized, the steps of achieving QW store per cycle are enabled by using the newly enhanced interface signal which enables the e-unit to request the BCE to write the incoming DW data-bus for both L1 cache interleaves, (35).

The BCE will use the same address to both L1 cache interleaves and effectively write two consecutively (even and odd) addressed DWs at the same cycle, thus achieving a QW store per cycle.

At each cycle when the E-unit is requesting a QW store, the corresponding JAM byte marks signal will be ON for the DW that is to be completely written over. When a JAM byte mark signal is active, the 8 byte marks of the corresponding L1 cache interleave will be forced to 1's. On the other hand, for the DW that only receives partial writes (potentially within the starting or ending DW), its corresponding JAM byte mark signal will be off, and the original byte mark from the E-unit will be used to write the appropriate bytes.

For a generic case where an instruction is storing same byte to those bytes marked with "x" below:

```
address (28)              0           1
address(1:27)    X  |     XXXX | XXXXXXXX |
                 X+1 | XXXXXXXXX | XXXXXXXX |
                 X+2 | XXXXXXXXX | XXXXXXXX |
                 X+3 | XXXXXXXXX | XXXXX    |
``` the E-unit will send the following signal sequences:

| Cycle # | byte marks | Jam Even | Jam Odd |
|---|---|---|---|
| 1 | 00001111 | 0 | 1 |
| 2 | 11111111 | 1 | 1 |
| 3 | 11111111 | 1 | 1 |
| 4 | 11111000 | 1 | 0 |

Effectively, instead of 8 single DW stores (taking 8 cycles), 4 QW stores will be done (in 4 cycles). Therefore, this example will have a 100% speed up.

While we have described our preferred embodiments of our invention, it will be understood that those skilled in the art, both now and in the future, may make various improvements and enhancements which fall within the scope of the claims which follow.

Using the previous example, if the L1 cache is 4-way interleaved instead, we could construct the hardware to do 4-DW stores per cycle, thus achieving a 200% speedup.

The claims should be construed to maintain the proper protection for the invention first disclosed.

What is claimed is:

1. A method for selectively storing Quad Words into a two-way interleaved L1 cache of a computer with a Double Word wide execution dataflow comprising the steps of:

receiving from an I-unit (instruction unit), of said computer capable of executing Quad Words and Double Words, store, details of an instruction sought to be executed, recognizing with an E-unit (execution unit), of said computer, instructions that could result in having same storing data patterns;

calculating address ranges information, with said E-unit, from source and destination address information and from said calculated address ranges information in said instruction sought to be executed, determining whether a corresponding multi-Double Word store with a same byte data will result for said address ranges, and, when a multi-Double Word store could result for said address ranges, then enabling the E-unit to request the writing of an incoming Double Word on a computer's data bus for both Double Word L1 Cache interleaves using the same destination address for both to effectively write two consecutively addressed Double Words for a same cycle to achieve a Quad Word store in said same cycle.

2. A computer system comprising, a processor having an I-unit (instruction unit) with an instruction decoder, an E-unit (execution unit), a BCE (buffer control element) containing a unified two-way interleaved L1 cache and providing write control to said two-way interleaved L1 cache, and wherein the processor has Double Word wide execution dataflow, said I-unit instruction decoder receives instruction data from said unified cache before decoding and for stores, causes the I-unit logic to initiate a request ahead of execution of an instruction to tell the buffer control element that stores will be made from the E-unit, and wherein E-unit logic sends a store request to initiate a store after decoding corresponding instruction data which indicates what address in said cache the Double Word data is to be stored to, and in processing instructions, said E-unit logic calculates address ranges information for an instruction sought to be executed from source and destination address information in said instruction sought to be executed and determines whether a corresponding multi-Double Word store with a same byte data will result from said instruction data and, when a multi-Double Word store could result, said E-unit logic enables the E-unit to request writing of an incoming Double Word on a computer's data bus for both Double Word's L1 cache interleaves using the same destination address for both to effectively write two consecutively addressed Double Words for the same cycle to achieve a Quad Word store in said same cycle.

3. A computer system according to claim 2 wherein said cache is a 4-way set associative cache with a cache directory which is 2-way interleaved on a Double Word basis, allowing separate reads or writes in each interleave per cycle when the separate operations of reading and writing have different values for an address bit which indicates whether the word is an ODD or EVEN Double Word within the cache address space.

* * * * *